United States Patent
Magdeburger et al.

(10) Patent No.: US 7,533,106 B2
(45) Date of Patent: May 12, 2009

(54) DATA STRUCTURES AND CIRCUIT FOR MULTI-CHANNEL DATA TRANSFERS USING A SERIAL PERIPHERAL INTERFACE

(75) Inventors: Thomas Magdeburger, Murphy, TX (US); Aaron Headley, Plano, TX (US)

(73) Assignee: Quickfilter Technologies, Inc., Allen, TX (US)

( * ) Notice: Subject to any disclaimer, the term of this patent is extended or adjusted under 35 U.S.C. 154(b) by 705 days.

(21) Appl. No.: 11/223,356

(22) Filed: Sep. 9, 2005

(65) Prior Publication Data

US 2007/0061342 A1     Mar. 15, 2007

(51) Int. Cl.
*G06F 17/30* (2006.01)
(52) U.S. Cl. .................. 707/100; 341/61; 341/100
(58) Field of Classification Search .......... 707/100; 341/61, 100
See application file for complete search history.

(56) References Cited

U.S. PATENT DOCUMENTS

| | | | |
|---|---|---|---|
| 4,739,324 A | 4/1988 | Miesterfeld et al. | |
| 4,742,349 A | 5/1988 | Miesterfeld et al. | |
| 4,816,996 A | 3/1989 | Hill et al. | |
| 4,873,623 A * | 10/1989 | Lane et al. | 700/83 |
| 4,958,277 A | 9/1990 | Hill et al. | |
| 5,298,921 A * | 3/1994 | Gulick | 710/106 |
| 5,630,152 A | 5/1997 | DeLuca et al. | |
| 5,828,592 A | 10/1998 | Tran et al. | |
| 5,954,813 A | 9/1999 | Mann et al. | |
| 6,167,466 A * | 12/2000 | Nguyen et al. | 710/30 |
| 6,302,654 B1 | 10/2001 | Millet et al. | |
| 6,366,768 B1 | 4/2002 | Tessier, Jr. et al. | |
| 6,664,833 B1 | 12/2003 | Fischer | |
| 6,665,593 B2 | 12/2003 | Otterbach et al. | |
| 6,687,769 B2 | 2/2004 | Cheung | |
| 6,691,183 B1 | 2/2004 | Ryan, Jr. | |
| 6,871,292 B1 | 3/2005 | Fischer | |

OTHER PUBLICATIONS

Freescale Semiconductor, Inc., SPI Block Guide V04.01, Jan. 21, 2000, Revised Jul. 14, 2004, Motorola, Inc., Document No. S12SPIV4/D.
International Searching Authority, International Application No. PCT/US06/33469, International Search Report and the Written Opinion, Mar. 26, 2008.
International Preliminary Examining Authority, International Application No. PCT/US06/33469, International Preliminary Report on Patentability, Oct. 21, 2008.

* cited by examiner

*Primary Examiner*—Cheryl Lewis
(74) *Attorney, Agent, or Firm*—John A. Thomas

(57) ABSTRACT

A serial interface controller provides for transferring data between a data source having a least one channel and a processor. The serial interface controller has a plurality of control registers; the control registers in turn include a data structure for configuring the serial interface controller for a data transfer. That data structure further comprises a field for selectively setting the serial interface controller in its run mode or its configuration mode; a field for storing the I/O mode of the serial interface controller; a field for storing the address of the active data channel; and, a field for storing the system clock rate. In the preferred embodiment, the control registers include fields for device identification, a flag for the run or configure mode, a I/O-mode control, a value for the channels active (in multi-channel implementations), the data source clock rate, the ADC clock rate, channel-status flags, the CIC decimation rate, the number of taps for FIR filters, and the filter coefficients corresponding to the number of FIR taps in a particular data source.

28 Claims, 5 Drawing Sheets

Configure Mode Format

Run Mode Format : Single Channel : 16 Bits Output

Run Mode Format : Multi Channel (1 to 4 shown) : 24 Bits Output

Configure Mode : Single Read Access

Configure Mode : Multiple Read Access (Address Auto Increment)

Configure Mode : Single Write Access

Configure Mode : Multiple Write Access (Address Auto Increment)

Run Mode : Single Channel : 16 Bits

Run Mode : Multiple Channels (1 to 4) : 16 Bits
Chip Select between Samples

Run Mode : Multiple Channels (1 to 4) : 16 Bits
No Chip Select between Samples

DATA STRUCTURES AND CIRCUIT FOR MULTI-CHANNEL DATA TRANSFERS USING A SERIAL PERIPHERAL INTERFACE

TECHNICAL FIELD

This disclosure relates to digital signal processing applications requiring the use of multi-channel signal processing hardware interfaced to microprocessors or Digital Signal Processors (DSP's). This invention provides a serial peripheral interface protocol and control procedure for minimizing processor overhead while transferring high data rate samples for further processing.

BACKGROUND

The Serial Peripheral Interface (SPI) is the signaling method of choice for efficiently communicating between a processor and a slave hardware device where "streams" of data are transferred between the devices. The SPI is a serial interface standard established by Motorola, Inc. (now Freescale Semiconductor, Inc.) and is supported in silicon products by several manufacturers. It is attractive since it requires minimum I/O pins, and allows different devices to implement software communication protocols to be constructed on top of this signaling protocol. FIG. 1 illustrates the basic prior-art SPI signaling protocol. The chip select signal (¬CS) is used to address a particular slave device, the master data output signal (SDI) is serial data transferred from the master to the slave on each serial clock, the master data input signal (SDO) is serial data transferred from the slave to the master, and the serial clock (SCLK) provides the clocking for the transfer. The meaning of each bit or field of bits in transferred data is application defined, and can be commands, status, addresses, or data in a predefined sequence.

In the signal processing domain, the master device is typically a Digital Signal Processor (DSP), a microprocessor, or a microcontroller, and the slave device is often a single or multi-channel analog-to-digital converter (ADC) or ADC with on-board filtering. The most used operational mode for single channel or low data-rate multiple channel devices is synchronous control. The DSP selects a device, sends a command, and provides the clocks for the slave to execute the command and send the resulting data and status back to the processor. For asynchronous multiple channel devices, allowing the devices to operate autonomously and then request output data transfers via an interrupt to the processor is a more efficient use of processing power. The high overhead associated with interrupt processing is costly, however, if there are a significant number of autonomous device channels having a high rate of data transfers. Therefore, an asynchronous control protocol that maximizes the data transferred while minimizing interrupts is preferred.

Additional signals are often added to the interface for convenience. FIG. 1 shows a common prior-art interface between a processor and multiple ADC channels. The processor starts multiple-channel data conversion by sending a signal, perhaps by sending an enable bit via the SDI pin with the appropriate channel selected by the ¬CSn signal. When the conversion is complete, the ADC acknowledges data ready (RDY) and, using an interrupt or polling routine, the processor recognizes data ready and controls the SPI bus to transfer the appropriate number of bits in the sample. If each ADC channel is operating at different sample rates, the processor must control each channel independently, and suffer the increased overhead for polling or interrupt handling. The processor must also handle each data sample independently.

SUMMARY

We disclose a serial interface controller for transferring data between a data source having a least one channel and a processor. The serial interface controller has a plurality of control registers; the control registers in turn comprise a data structure for configuring the serial interface controller for a data transfer. That data structure further comprises a field for selectively setting the serial interface controller in its run mode or its configuration mode; a field for storing the I/O mode of the serial interface controller; a field for storing the address of the active data channel; and, a field for storing the system clock rate. In the preferred embodiment, the control registers include fields for device identification, a flag for the run or configure mode, a I/O-mode control, a value for the channels active (in multi-channel implementations), the data source clock rate, the ADC clock rate, channel-status flags, the CIC decimation rate, the number of taps for FIR filters, and the filter coefficients corresponding to the number of FIR taps in a particular data source.

An integrated circuit comprising a serial interface controller for transferring data between a data source and a processor is also disclosed. The serial interface controller in the integrated circuit has a plurality of control registers. The control registers have a data structure for configuring the serial interface controller for a data transfer. The data structure further comprises: a field for selectively setting the serial interface controller in its run mode or its configuration mode; a field for storing the I/O mode of the serial interface controller;

a field for storing the address of the active data channel; and, a field for storing the system clock rate.

FIGURES

Figure 3A:
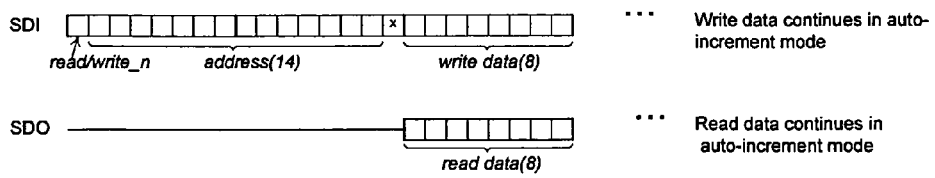
Figure 3B:
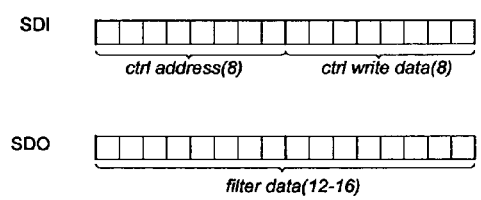
Figure 3C:
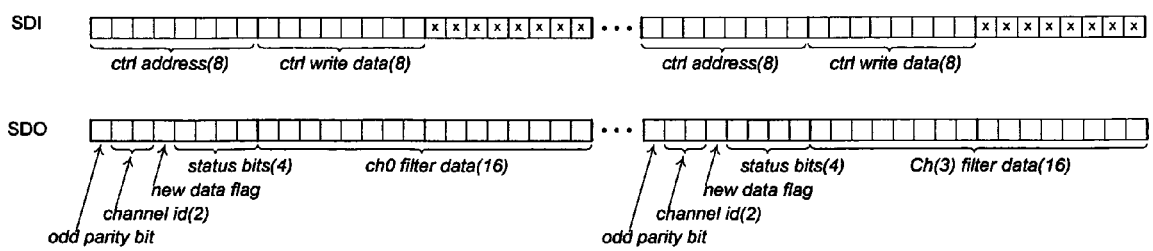
Figure 4A:
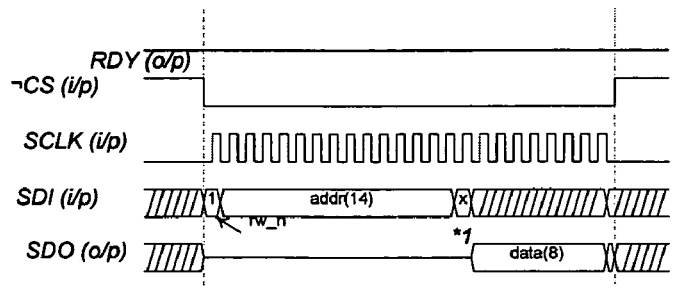
Figure 4B:
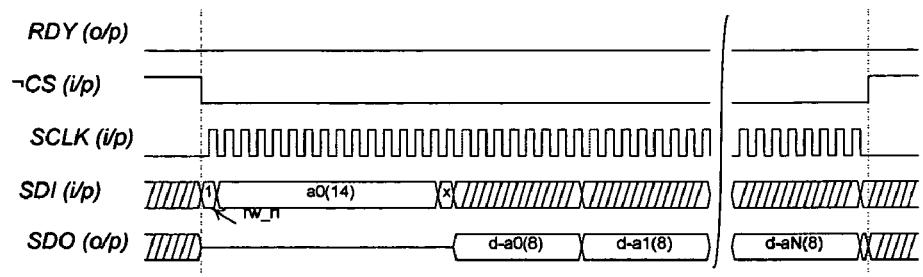
Figure 4C:
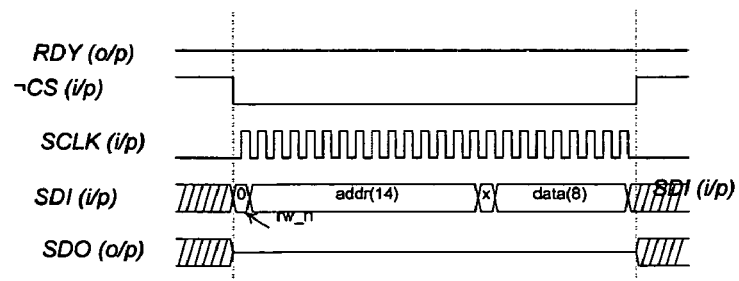
Figure 4D:
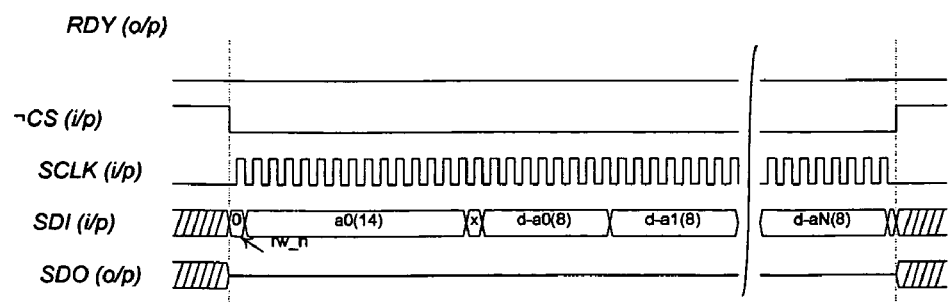

FIG. 3A-3C defines data and addressing formats for the preferred embodiment.

Figure 5A:
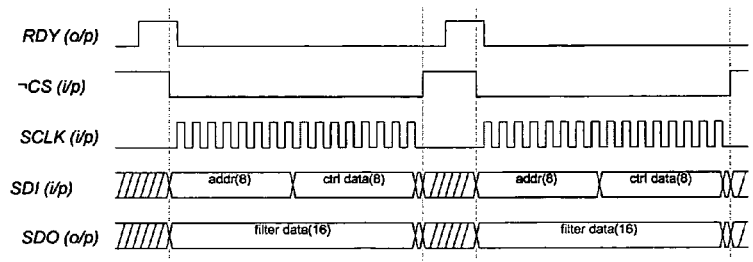
Figure 5B:
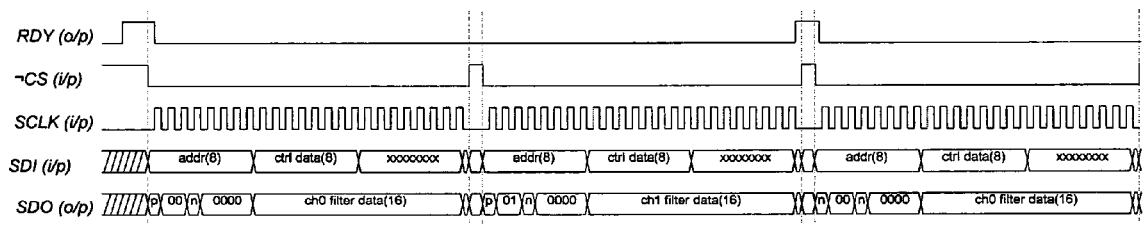
Figure 5C:
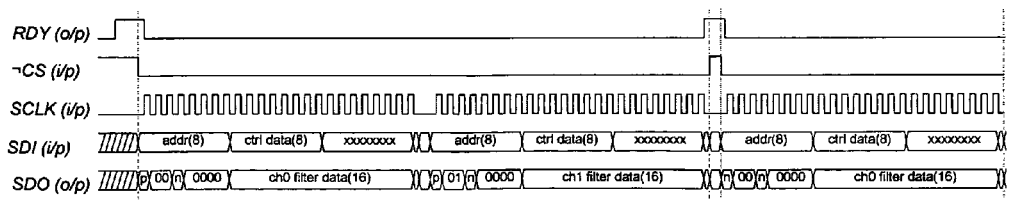

FIG. 4A-4D illustrates the timing for the configuration mode data transfers of the preferred embodiment FIG. 5A-5C shows the timing for run mode transfers in the preferred embodiment.

DESCRIPTION

Figure 2:
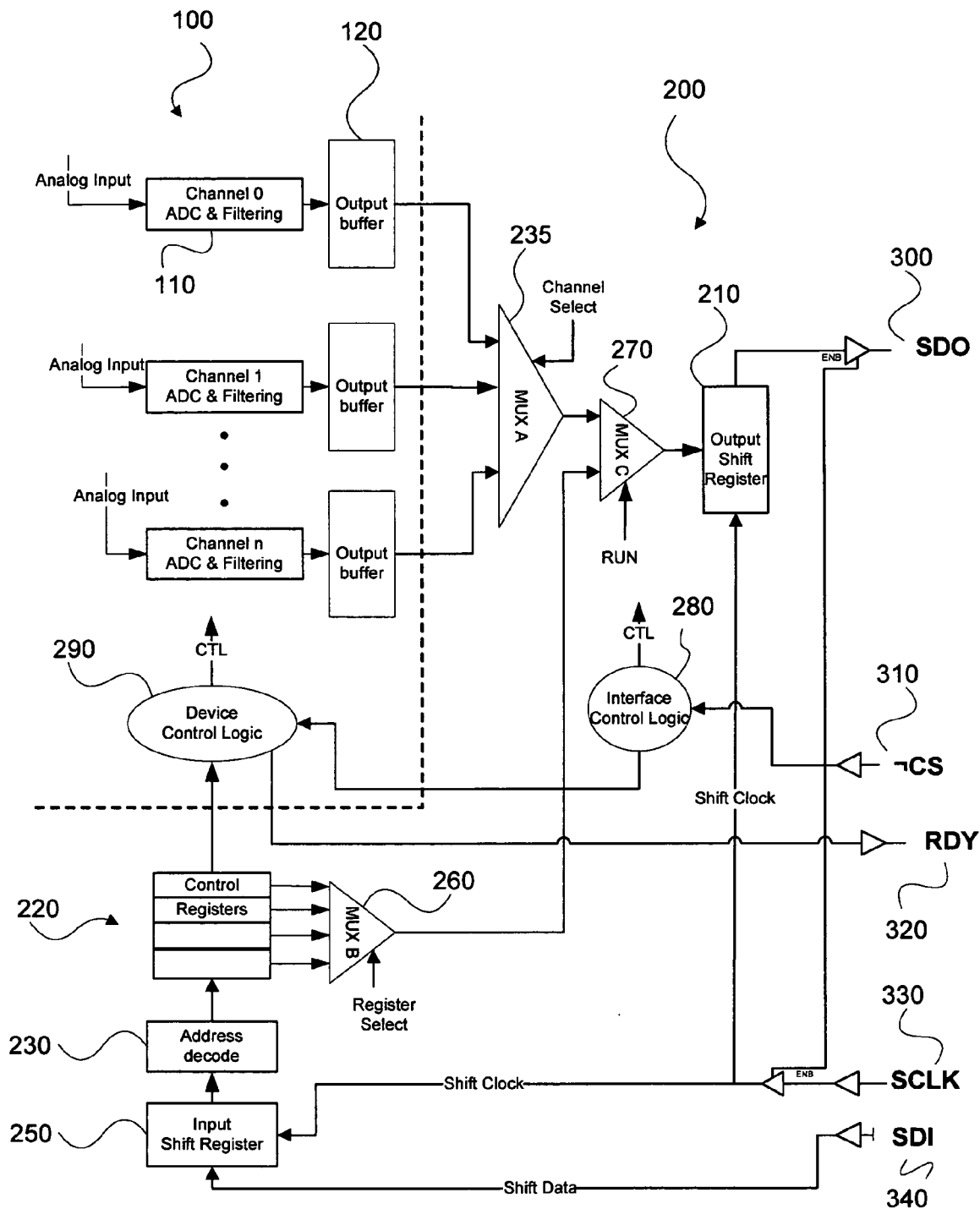
FIG. 2 is a block diagram showing the preferred embodiment.

FIG. 2 presents a block diagram for an embodiment that has a multi-channel signal-processing capability (100) executing independently of a system processor, and a serial interface controller (200) that operates on a serial clock provided by the processor. The signal-processing capability (100) illustrated in FIG. 2 is an ADC and filtering function, although of course any application that requires the transfer of high rate, multiple channel data to a receiving processor could be conveniently adapted to the system and method here disclosed. The data source (100) thus need not be a digital-filter system.

The serial interface communicates with the processor (not shown) through the standard Serial Peripheral Interface (SPI) I/O signals used by many processors to communicate with peripheral devices, where each device may be a single integrated circuit or a collection of circuits to perform desired processing functions. For example, the processor may be a TI TMS 5500 series DSP, having an SPI port, its own memory space, and executing a stored program. FIG. 2 shows the signal lines relevant for this communication as follows:

| | | |
|---|---|---|
| SDO | Serial Data Out (300) | |
| ¬CS | Chip Select (active low) (310) | |
| RDY | Ready (320) | |
| SCLK | Serial Clock (330) | |
| SDI | Serial Data In (340) | |

The example filter bank (100) may have one to n processing channels (110), and an output buffer (120) for each channel containing data to be transferred to the processor. The buffer (120) is preferably byte oriented; containing from one to m bytes of information, since most processor SPI controllers operate on bytes. The device is configured by serial transfers from the processor to the device control registers (220). These registers (220) activate and control all aspects of device operation. In the data conversion and filtering application shown, the registers contain all parameters to set the ADC conversion rate, define the filtering function, and therefore set the rate that results, or samples, are updated in the output buffers. In the embodiment depicted, these registers are shown in the following Table 1:

TABLE 1

| Address | Data (8 bits) |
|---|---|
| 0 | Device ID (Read Only) |
| 1 | Run Mode |
| 2 | I/O Mode Control |
| 3 | Channels Active Bits |
| 4 | System Clock Rate (for data source operations) |
| 5 | ADC Clock Rate |
| 6 | Channel Status Bits |
| 7 | CIC Decimation MSB's |
| 8 | CIC Decimation LSB's |
| 9 | No. Taps MSB's |
| 10 | No. Taps LSB's |
| 11 | Channel 0 Filter Coefficient 0 MSB's |
| 12 | Channel 0 Filter Coefficient 0 NSB's |
| 13 | Channel 0 Filter Coefficient 0 LSB's |
| 14 | Channel 0 Filter Coefficient 1 MSB's |
| 15 | Channel 0 Filter Coefficient 1 NSB's |
| 16 | Channel 0 Filter Coefficient 1 LSB's |
| ... | ... |
| 776 | Channel 0 Filter Coefficient 255 MSB's |
| 777 | Channel 0 Filter Coefficient 255 NSB's |
| 778 | Channel 0 Filter Coefficient 255 LSB's |
| 779-1552 | Channel 1 Control &Coefficients (Repeat of above) |
| 1553-2326 | Channel 2 Control &Coefficients (Repeat of above) |
| 2327-3100 | Channel 3 Control &Coefficients (Repeat of above) |
| 3101-3874 | Channel 4 Control &Coefficients (Repeat of above) |
| 3875-4648 | Channel 5 Control &Coefficients (Repeat of above) |
| 4647-5422 | Channel 6 Control &Coefficients (Repeat of above) |
| 5423-6196 | Channel 7 Control &Coefficients (Repeat of above) |

In Table 1, "CIC" means a cascaded-integrator comb filter; "MSB" means most-significant byte; "NSB" means next-significant byte, and "LSB" means least-significant byte. In the preferred embodiment $2^{14}$ registers are provided, so many control channels beyond the seven shown in Table 1 are available for data sources having multiple channels.

Addresses 0 through 4 are global device control bits. Address 0 is read-only and contains the device ID number. Address 1 contains a single bit that sets the device in the run mode. If this bit is off, the device is in the configure mode. Address 2 controls the I/O mode per the following definition:

| Bits | Field Name | Definition |
|---|---|---|
| 0-2 | FastChannel | Fastest Active Channel ID |
| 3 | not used | |
| 4 | EachChannelRDY | Set RDY for each channel; else fastest channel |
| 5 | SingleChannel | Single-channel output if set; else multiple channel |
| 6 | AutoIncrement | Auto-increment mode if set |
| 7 | not used | |

The System Clock Rate value at address 4 in the control register (220) is the clock rate of the data source (100). It may be asynchronous with the processor clock signal SCLK (330).

The channel-status bits at address 6 in the control register (220) are determined by the nature of the data source (100). In the embodiment shown, the channel-status bits would be overflow or underflow bits for the output buffer (120) of each channel.

The data in the remaining addresses are self-explanatory. Note that these control bits, as defined, support a device with eight channels, each with an ADC, a CIC filter with a maximum decimation value of 65,536 ($2^{16}$), and an FIR filter with a maximum of 512 taps (256 coefficients or tap weights).

The serial interface controller (200) circuitry contains an output shift register (210), and the multiplexers required to select, for parallel transfer to the register, any device channel's output buffer (120) or any byte of the device control registers (220). In the embodiment shown, the output register is 24 bits wide to accommodate multi-channel data transfers, as shown in FIG. 3C. Multiplexer A in FIG. 2 (235) selects the device channel output buffer, multiplexer B (260) selects the device control register (220) addressed by the address field (described below) of the input shift register (250), and multiplexer C (270) selects either the addressed device control register (220) or the selected device channel output buffer (120). The address decode and control function (230) decodes the address in the input shift register (250) and, based upon the current configuration or the read/write bit in that register, controls writing to the control registers (220).

The register-select lines on multiplexer B (260) are generated by the address decode logic (230) to select the appropriate register to output on a read command. The channel-select lines on multiplexer A (235) are generated by the interface control logic (280) with inputs from the control registers (220). In run mode, the lines select the first (numerical order) channel output buffer with its channel-active bit set in the control register (220) at address 3. If the single channel bit is set in the control register (220) at address 2, it will lock on the single active channel; if this bit is not set, the interface control logic will sequence through the active channels in response to a chip select (310) and SCLK sequence (330).

The processor connected by way of the SPI bus controls all data transfers in and out of the filter bank (100) or similar device, according to its stored program. The data transferred and its interpretation is determined by the configuration mode of the device (100) and the prescribed protocol or format of each byte transferred.

The serial interface controller (200) operates in two basic modes: the configuration mode, in which the processor is reading or writing data to the control registers (220), and the run mode, in which the processor is reading the data source (100) active-channel output buffers (120) and simultaneously writing to a subset of the control registers (220). The processor sets the device in the configure or run mode by setting a bit in a control register by a serial write to the device.

FIG. 3 shows the data structures for these modes. Within these basic modes, the data formats can be further refined. The configure mode has an automatic address increment feature that permits a block of data to be read or written by shifting in a single address followed by a series of input bytes of write data via the SDI signal, or to output bytes of read data via the SDO signal as long as ¬CS is held low and the processor continues to provide SCLK signals. The address auto-increment mode is set by a control write bit to a control register in the configure mode. When enabled, the interface controller interprets the first two serial bytes as a 14 bit address (as shown in FIG. 3A). The controller then stores the next serial byte in the register addressed, if a write command, or reads and shifts out the register addressed if a read command; increments the address, and reads or writes the next byte, continuing the process until ¬CS (310) is pulled high.

The run mode has two data output formats: a single channel format that outputs two bytes of sample data from that channel with no control and status field (FIG. 3B), and a multi-channel format that outputs three bytes of data for each channel's sample, including an eight-bit control and status field and 16 bits of sample data (FIG. 3C). The number of bytes and the bit size of the control and data fields in the following discussion are, of course, only exemplary, and could differ in other implementations.

In the configure mode, there is a means for selectively individually addressing the control registers. In the configure-mode data structure shown in FIG. 3A the first 16 bits shifted into the input shift register (250) includes a read/write control bit and 14 bits of address. This address points to the control register (220) to be read or written. The last byte shifted in contains the data to be written for a write command, or the data from the register addressed to be shifted out for a read command. This read byte is transferred to the output shift register (210) and is clocked out to the processor. If the device is in the auto-increment mode, the read or write of data bytes continues without the processor transferring a new address, as long as ¬CS (310) is held low.

The run mode is set by the processor with a configure-mode data transfer. The run-mode format can be a two-byte data out field for a single channel configuration (FIG. 3B), or single or multiple three-byte fields for a multi-channel configuration (FIG. 3C). Note that the processor can write data to the control registers (220) during a read of the output data, but to a restricted register set as explained below. This is required to take the device out of the run mode, for example, but may be used to set other registers within the current configuration. If the processor does not wish to modify a register, the serial input data must address an unused (or read only) register.

In the single channel configuration (FIG. 3B), the first byte shifted in is the write address and the second byte is the write data. The eight-bit address is a subset of the full 14-bit address space, thus allowing access to only the lower 256 ($2^8$) registers. Simultaneously, the 16 bits of output samples are shifted out to the processor. In the multi-channel configuration (FIG. 3C), the first 16 bits shifted in from the serial input as the processor reads the data output samples represents the address and write data, and the 24 bits shifted out to the processor represents 8 bits of status and control and 16 bits of sample data. For the four-channel device described, the status and control byte includes a parity bit, a two-bit channel ID field, a new data flag to indicate that the output sample has been updated, and four channel-status bits. Other implementations, for example a device with eight channels, can use the same general format by displaying fewer status bits and increasing the channel ID bit field to three bits. Only one status bit is absolutely required. In this case, it would tell the processor to read the status registers in the control registers to identify the change in device status.

The serial interface operates as follows. FIG. 4 shows the timing of signals in the configure mode. The processor starts a transfer by addressing the device with chip select (310) by bringing ¬CS low from its normally high state, and using SCLK (330) to shift data into the input shift register (250) from the serial input signal SDI (340), or out of the output shift register (210) through the SDO line. The processor provides 24 SCLK's to transfer the address and first byte of data. In the auto-increment mode the processor continues to provide clocks and data for as many sequentially addressed bytes of the control registers that it wishes to read or write. If the read/write control indicates read, the interface control logic (280) addresses, with the first two bytes, the desired control register (220), and transfers this byte to the output shift register (210) to be shifted out the SDO pin (300) by the last eight SCLK's. If the first bit indicates write, the last eight bits are written to the addressed control register (220) by the address decode and write controller (230). If the device is in the auto-increment mode, bytes of information will continue to be input or output, with the controller (280) incrementing the internal address after each byte is written or transferred to the output shift register (210) and output SDO (300). The processor terminates the operation by removing chip select (bringing ¬CS high).

FIG. 5 shows signal timing for the run mode. The device sets and outputs the data ready RDY (320) signal when new data for the highest rate active channel is placed in that channel's output buffer (120), and, by default, selected to the output shift register (210). RDY is set when the fastest device channel, identified by a field in the control registers, transfers a new data sample to that channel's output buffer (120), setting a new data flag bit in the register at the same time. The new data flag, and thus the RDY signal, are reset after the samples have been transferred to the output shift register (210). The processor, which may poll RDY (320) or respond to the signal via an interrupt, addresses the device with chip select ¬CS (310), and provides clock pulses through SCLK (330) to perform the transfers with write address and configuration data being input on the SDI (340) and sample data being output on the SDO (300). If the device is in a single-channel configuration, the processor provides 16 clocks to transfer the 16 bits of data from the active channel through the SDO signal (300), and, if desired, write a single byte into a control register (220). The processor completes the transfer by removing chip select (310). The write is performed to the address specified by the first eight bits of data in SDI (340) with the last eight bits being the data to be written.

In the multi-channel configuration, the processor reads 24 bits of data with 24 SCLK's from the first active channel; this being the default selection to the output shift register (210). The active channels are those that have been placed in the active mode by way of control fields in the control registers (220). Then the output shift register (210) is updated with the next active channel's output buffer (120) and this data is output with the next 24 SCLK's; this process continues until all active channel's output buffers (120) are transferred, and the processor terminates the transfer by removing chip select (310). The active channels are read out in numerical order. Note that a channel can be read that has not updated its output buffer (120) since the last read cycle. This will occur if a channel is processing samples at a lower rate than the fastest channel. The processor recognizes this state by the new-data flag in the data format, and may choose not to store this data in processor memory. This flag is reset when that channel's output buffer (120) is transferred to the output shift register (210). After all active channels have been read; the processor terminates the transfer by removing chip select (310) and awaits the next RDY signal (320). In this mode the first 16 bits input on the SDI signal (340), shifted into the input shift register (250), are interpreted as eight bits of address and eight bits of data for writing to the restricted set of control registers (220). Again, the upper 6 bits of the 14 bit address are set to zero in the run mode. Thus only 256 registers are accessible.

Figure 1:
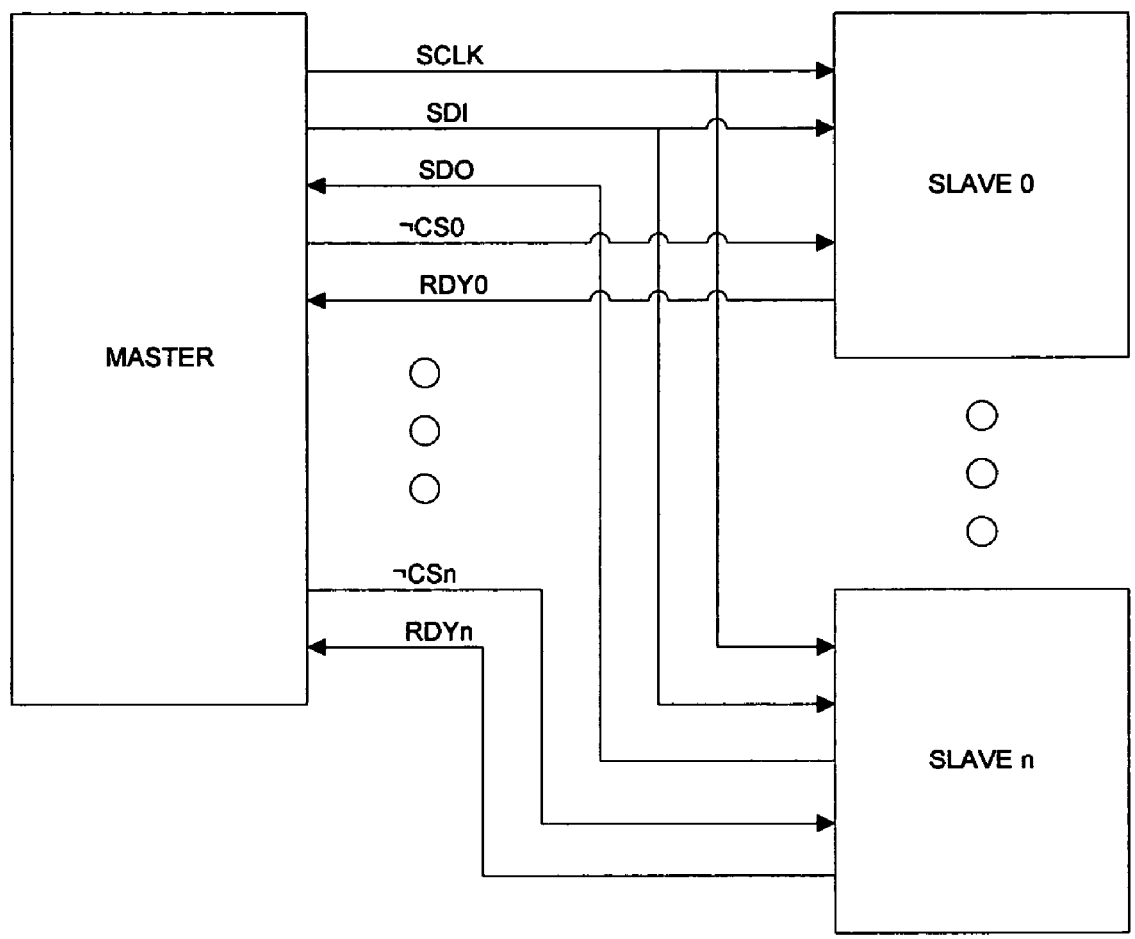
FIG. 1 depicts generally the prior-art serial-peripheral interface (SPI) signaling protocol.

Thus, with one interrupt (the RDY signal (320)), the processor will execute the transfer of sample data from all active channels. If there are multiple devices connected to the processor, the processor can read all active channels' sample outputs based on a single interrupt by addressing each device in numerical order with the individual device chip selects as shown in FIG. 1. The processor has programmed all devices and thus knows which device has the highest rate channel. The only constraint is that the processor must transfer all channels samples before the highest sample rate device produces its next sample.

Alternatively, the device can be set, by a control bit in the control registers, into a single channel interrupt mode. In this mode, data ready (RDY) will be set when any active channel places a new result in its output buffer. The processor will respond to data ready as before, but read only that channel that set data ready. This approach may be used if the sample rates for each channel are relatively slow and vary widely.

We claim:

1. A serial interface controller for transferring data between a data source having a least one channel and a processor; the serial interface controller having a plurality of control registers; the control registers comprising:
    a data structure for configuring the serial interface controller for a data transfer;
    the data structure further comprising:
        a field for selectively setting the serial interface controller in its run mode or its configuration mode;
        a field for storing the I/O mode of the serial interface controller;
        a field for storing the address of the active data channel; and,
        a field for storing the clock rate of the data source.

2. The serial interface controller of claim 1, where the data source is a CIC digital filter, and the data structure further comprises:
    a field for storing the decimation value of the CIC.

3. The serial interface controller of claim 1, where the data source is an FIR digital filter, and the data structure further comprises:
    a field for storing the number of filter taps; and,
    a field for storing the coefficients for the FIR filter.

4. The serial interface controller of claim 3, comprising more than one data channel, where the data structure further comprises, for each channel:
    a field for storing the number of filter taps for the channel; and,
    a field for storing the coefficients for the FIR filter for that channel.

5. The serial interface controller of claim 1, where the data structure further comprises a field for storing the ADC clock rate for a digital filter.

6. The serial interface controller of claim 1, where the I/O mode field further comprises:
    a field for storing the address of the fastest active channel;
    a field for selectively storing the serial interface RDY flag for each channel or the fastest channel; and,
    a field for storing a flag for selectively setting either single-channel data transfers or multiple-channel data transfers.

7. The serial interface controller of claim 1, further comprising a means for selectively individually addressing the control registers.

8. The serial interface controller of claim 7, where the means for selectively individually addressing the control registers comprises a configure-mode data structure; the configure-mode data structure comprising:
    a field for selectively setting the data transfer to the addressed control register to read or write;
    a field storing an address of the addressed control register; and,
    a field storing data to be written to or read from to the addressed control register.

9. The serial interface controller of claim 8, where the configure-mode data structure is configured so that:
    the field for selectively setting the data transfer to the addressed control register to read or write holds one bit;
    the field storing an address of the addressed control register holds 14 bits;
    the field storing data to be written to or read from the addressed control register holds eight bits; and,
    the configure-mode data structure further comprises a one-bit unused field between the address field and the data field.

10. The serial interface controller of claim 1 further comprising a data structure defining an input and output format for a single-channel run mode; the data structure so defining an input and output format for a single-channel run mode comprising:
    an eight-bit control address field and an eight-bit control-register data field; and,
    a 16-bit data-out field.

11. The serial interface controller of claim 1 further comprising a data structure defining an input and output format for a multiple-channel run mode; the data structure so defining an input and output format for a multiple-channel run mode comprising:
    an eight-bit control-address field;
    an eight-bit control-register data field; and,
    an unused eight-bit field.

12. The serial interface of claim 11 further comprising a 24-bit data structure for output data.

13. The serial interface controller of claim 11 where the 24-bit data structure for output data further comprises:
    a one-bit parity field;
    a two-bit channel-identification field;
    a one-bit new-data flag field;
    a four-bit status field; and,
    a 16-bit data field.

14. An integrated circuit comprising:
    a data source having at least one channel; and,
    a serial interface controller for transferring data between the data source and a processor; the serial interface controller having a plurality of control registers; the control registers comprising:
        a data structure for configuring the serial interface controller for a data transfer; the data structure further comprising:
            a field for selectively setting the serial interface controller in its run mode or its configuration mode;
            a field for storing the I/O mode of the serial interface controller;
            a field for storing the address of the active data channel; and,
            a field for storing the system clock rate.

15. The integrated circuit of claim 14, where the data source is a CIC digital filter, and the data structure further comprises:

a field for storing the decimation value of the CIC.

16. The integrated circuit of claim 14, where the data source is an FIR digital filter, and the data structure further comprises:

a field for storing the number of filter taps; and, a field for storing the coefficients for the FIR filter.

17. The integrated circuit of claim 16, comprising more than one data channel, where the data structure further comprises, for each channel:

a field for storing the number of filter taps; and, a field for storing the coefficients for the FIR filter.

18. The integrated circuit of claim 14, where the data structure further comprises a field for storing the ADC clock rate for a digital filter.

19. The integrated circuit of claim 14, where the I/O mode field further comprises:

a field for storing the address of the fastest active channel;

a field for selectively storing the serial interface RDY flag for each channel or the fastest channel; and, a field for storing a flag for selectively setting either single-channel data transfers or multiple-channel data transfers.

20. The integrated circuit of claim 19, further comprising interface control logic responsive to the flag for selectively setting either single-channel data transfers or multiple-channel data transfers.

21. The integrated circuit of claim 14, further comprising a means for selectively individually addressing the control registers.

22. The integrated circuit of claim 21, where the means for selectively individually addressing the control registers comprises a configure-mode data structure; the configure-mode data structure comprising:

a field for selectively setting the data transfer to the addressed control register to read or write;

a field storing an address of the addressed control register; and, a field storing data to be written to or read from to the addressed control register.

23. The integrated circuit of claim 22, where the configure-mode data structure is configured so that:

the field for selectively setting the data transfer to the addressed control register to read or write holds one bit;

the field storing an address of the addressed control register holds 14 bits;

the field storing data to be written to or read from the addressed control register holds eight bits; and, the configure-mode data structure further comprises a one-bit unused field between the address field and the data field.

24. The integrated circuit of claim 14 further comprising a data structure defining an input and output format for a single-channel run mode; the data structure so defining an input and output format for a single-channel run mode comprising:

an eight-bit control address field and an eight-bit control-register data field; and, a 16-bit data-out field.

25. The integrated circuit of claim 14 further comprising a data structure defining an input and output format for a multiple-channel run mode; the data structure so defining an input and output format for a multiple-channel run mode comprising:

an eight-bit control-address field;

an eight-bit control-register data field; and, an unused eight-bit field.

26. The integrated circuit of claim 25 further comprising a 24-bit data structure for output data.

27. The integrated circuit of claim 25 where the 24-bit data structure for output data further comprises:

a one-bit parity-bit field;

a two-bit channel-identification field;

a one-bit new-data flag field;

a four-bit status field; and, a 16-bit data field.

28. The integrated circuit of claim 27 where the data structure for output data is clocked out of the serial interface controller to the processor according to the processor clock.

* * * * *